US012729333B2

(12) United States Patent
Fujita et al.

(10) Patent No.: US 12,729,333 B2
(45) Date of Patent: Sep. 8, 2026

(54) POWDER MATERIAL FOR SINTERING AND SOLID LATENT HEAT STORAGE MEMBER INCLUDING THE SAME

(71) Applicant: NATIONAL INSTITUTE OF ADVANCED INDUSTRIAL SCIENCE AND TECHNOLOGY, Tokyo (JP)

(72) Inventors: Asaya Fujita, Nagoya (JP); Hiroyuki Nakayama, Nagoya (JP); Yoshiaki Kinemuchi, Nagoya (JP); Kimihiro Ozaki, Nagoya (JP); Haruka Abe, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 1130 days.

(21) Appl. No.: 17/420,737

(22) PCT Filed: Dec. 4, 2019

(86) PCT No.: PCT/JP2019/047453

§ 371 (c)(1),
(2) Date: Jul. 6, 2021

(87) PCT Pub. No.: WO2020/144982

PCT Pub. Date: Jul. 16, 2020

(65) Prior Publication Data

US 2022/0064510 A1 Mar. 3, 2022

(30) Foreign Application Priority Data

Jan. 9, 2019 (JP) ................................ 2019-001522

(51) Int. Cl.
*C09K 5/06* (2006.01)
*C01G 31/02* (2006.01)
*F28D 20/02* (2006.01)

(52) U.S. Cl.
CPC .............. *C09K 5/063* (2013.01); *C01G 31/02* (2013.01); *F28D 20/02* (2013.01);
(Continued)

(58) Field of Classification Search
CPC ......... C09K 5/063; C01G 31/02; F28D 20/02; C01P 2002/52; C01P 2002/72; C01P 2004/03; C01P 2006/32
See application file for complete search history.

(56) References Cited

U.S. PATENT DOCUMENTS

2016/0075926 A1 3/2016 Niitaka et al.
2016/0156213 A1 6/2016 Yajima et al.
2018/0307122 A1 10/2018 Sugiyama et al.

FOREIGN PATENT DOCUMENTS

EP 1 016 149 A1 7/2000
JP 2001-510930 A 8/2001
(Continued)

OTHER PUBLICATIONS

WO 2016/006338 A1 translation. (Year: 2016).*
(Continued)

*Primary Examiner* — Angela C Brown-Pettigrew
*Assistant Examiner* — Jiajia Janie Cai
(74) *Attorney, Agent, or Firm* — Birch, Stewart, Kolasch & Birch, LLP

(57) ABSTRACT

[PROBLEM TO BE SOLVED] To provide a solid heat storage material that is made of a $VO_2$-based inorganic material, is easy to sinter, has a high latent heat storage capacity, and can be suitably used as a phase change solid heat storage material, and a method of manufacturing the same.

(Continued)

[SOLUTION] A powder material for sintering of a first aspect of the present invention includes vanadium and oxygen and includes a vanadium oxide represented by the chemical formula $VO_2$ and at least one other type of vanadium oxide, in which, when the molar ratio of V and O in all the powder is expressed as 1:(2+d), d is in the range of 0<d<0.5.

5 Claims, 20 Drawing Sheets

(52) U.S. Cl.
CPC ...... *C01P 2002/52* (2013.01); *C01P 2002/72* (2013.01); *C01P 2004/03* (2013.01); *C01P 2006/32* (2013.01)

(56) References Cited

FOREIGN PATENT DOCUMENTS

| | | | | | |
|---|---|---|---|---|---|
| JP | 2010-163510 | A | | 7/2010 | |
| JP | 2014-210835 | A | | 11/2014 | |
| JP | 2015-29036 | A | | 2/2015 | |
| JP | 2015-71795 | A | | 4/2015 | |
| JP | 2016-69609 | A | | 5/2016 | |
| JP | 2016-108570 | A | | 6/2016 | |
| JP | 2016-160148 | A | | 9/2016 | |
| JP | 2017-190377 | A | | 10/2017 | |
| WO | WO 99/04441 | A1 | | 1/1999 | |
| WO | WO 2015/151355 | A1 | | 10/2015 | |
| WO | WO-2016006338 | A1 | * | 1/2016 | ............... C03C 3/21 |
| WO | WO 2016/114296 | A1 | | 7/2016 | |
| WO | WO 2017/073010 | A1 | | 5/2017 | |

OTHER PUBLICATIONS

"Porous W-doped VO2 films with simultaneously enhanced visible transparency and thermochromic properties", Hu et al., J Sol-Gel Sci Technol 77:85-93 (2016). (Year: 2016).*

"Thermochromic VO2 thin film prepared by post annealing treatment of V2O5 thin film", Advanced Materials Research, vols. 79-82, pp. 747-750, 2009. (Year: 2009).*

International Preliminary Report on Patentability, issued in PCT/JP2019/047453, dated Mar. 30, 2021.

International Search Report, issued in PCT/JP2019/047453, dated Feb. 4, 2020.

Kato et al., "Influence of strain on latent heat of $VO_2$ ceramics", Journal of Alloys and Compounds, 2018, vol. 751, pp. 241-246.

Luo et al., "The effect of stoichimetry of $VO_2$ nano-grain ceramics on their thermal and electrical properties", Materials Chemistry and Physics, 2007, vol. 104, pp. 258-260.

Muramoto et al., "$VO_2$-dispersed glass: A new class of phase change material", 2018, vol. 8, No. 2275, total 8 pages.

Written Opinion of the International Searching Authority, issued in PCT/JP2019/047453, dated Feb. 4, 2020.

* cited by examiner

POWDER MATERIAL FOR SINTERING AND SOLID LATENT HEAT STORAGE MEMBER INCLUDING THE SAME

TECHNICAL FIELD

The present invention relates to a powder material for sintering and a solid latent heat storage member including the same.

BACKGROUND ART

In recent years, as a technique for effectively utilizing heat energy, heat storage methods have been proposed in which heat is stored and taken out when needed. Materials useful for heat storage include a type in which sensible heat derived from large specific heat is utilized and a type in which latent heat derived from spontaneous endothermic and exothermic reactions during phase transitions is utilized. In the case of a phase change material (PCM) in which latent heat can be utilized, the transition between a gas phase and a liquid phase is often utilized, and with the most familiar $H_2O$ phase transition (water-ice) at the top, solid-liquid phase changes of paraffin, sugar alcohol, and the like are utilized, which have the advantage of being able to store a large amount of heat of several hundred kJ per kg.

However, as long as a solid-liquid phase change is involved, the shape cannot be maintained in a liquid phase state, and a support such as a capsule is required to avoid leakage and exudation, whereby the system is always accompanied by an extra heat load and the equipment becomes complicated. In addition, thermal conductivity changes significantly before and after melting, and internal convection affects solidification from a liquid phase, whereby completion of the solidification prolongs the operating speed.

In order to solve such problems, a solid heat storage material has also been proposed, in which a phase transition due to the freedom of contained electrons is utilized with the state of atoms and molecules remaining solidness (hereinafter referred to as "phase change solid heat storage material").

For such a phase change solid heat storage material, vanadium dioxide $VO_2$ is known as a material exhibiting suitable characteristics. The $VO_2$ is an insulator at room temperature, but when the material is heated, a phase transition occurs from the insulator phase to the metal phase around the critical temperature Tp=67° C. In addition, once the temperature drops from the high temperature state in which the phase has changed to the metal phase, the phase returns to the original insulator phase again at around Tp. The latent heat of this phase transition is about 220 J/cc, and an amount of heat equivalent to the latent heat is absorbed from the outside in the temperature rising process, and the amount of heat equivalent to the latent heat is released to the outside in the temperature lowering process. (See, for example, Patent Literature 1, 2, or 3)

However, in order to mass-produce $VO_2$ that has a powder form as a final form (see Patent Literature 4 or 5), even if the powder form is classified as a solid phase, a dedicated method for storing the powder all together is actually required for its use. Therefore, it has been pointed out that it is necessary to deal with fluidity as in the case of a conventional heat storage material in which a liquid phase is involved (see Non-Patent Literature 1). In order to avoid the above situation, it is conceivable to solidify $VO_2$ as a sintered body, but ceramics obtained by sintering $VO_2$ by ordinary means are not resistant to stress application and easily break (See Non-Patent Literature 2). Non-Patent Literature 2 proposes avoiding breakage by a microstructure resulting from sintering of nanometer-sized $VO_2$ powder particles as a starting material in order to avoid breakage. However, the sample obtained by the above method is separated into micrometer-sized aggregated grains in which nanometer-sized crystal grains are aggregated, and bonding between these aggregated grains has not been confirmed. The effect of the above method on improvement of the density and mechanical strength of the sintered body of the whole sintered member has not been investigated and is therefore completely unknown. In addition, although deviation of the $VO_2$ phase from the chemical bilateral composition and mixture of a $V_6O_{13}$ phase that occur when nanometer-sized $VO_2$ is produced have been pointed out, these changes have only been reported to reduce the amount of latent heat, and the relationship with the improvement of the density and mechanical strength has not been examined at all and remains unclear.

Further, Patent Literature 6 proposes to mold and utilize a solid heat storage material. However, Patent Literature 6 does not show any measure for solid-bulking $VO_2$ itself into a moldable solid and proposes a method of dispersing $VO_2$ in a binder dissolved in water or an organic solvent and drying it to maintain its form. Since it is the binder that guarantees the moldability, and in principle, it is not much different from a method of surrounding a member with a container, and the strength of the obtained member is not guaranteed at all.

Further, Patent Literature 7 proposes a method of obtaining a member by dispersion in a resin having high thermal conductivity, and Non-Patent Literature 1 proposes a phase change solid heat storage material in which $VO_2$ is dispersed in glass. However, in these methods, even though a certain strength is maintained, since it is unavoidable that most of the volume is composed of resin or glass in order to form and maintain the solid form, that is, the effective amount of $VO_2$ per volume cannot be acquired, the heat storage capacity of the sample as a whole is diminished, and the function as a heat storage material is significantly impaired.

CITATION LIST

Patent Literature

Patent Literature 1: Japanese Unexamined Patent Publication No. 2010-163510

Patent Literature 2: Japanese Unexamined Patent Publication No. 2014-210835

Patent Literature 3: Japanese Unexamined Patent Publication No. 2015-071795

Patent Literature 4: Japanese Unexamined Patent Publication No. 2016-108570

Patent Literature 5: Japanese Unexamined Patent Publication No. 2017-190377

Patent Literature 6: Japanese Unexamined Patent Publication No. 2016-069609

Patent Literature 7: WO 2017/073010

Non-Patent Literature

Non-Patent Literature 1: Scientific REPORTS (2018) 8:2275

Non-Patent Literature 2: Materials Chemistry and Physics (2007) vol. 104, pp. 258-260

SUMMARY OF INVENTION

Technical Problems

The present invention has been made in view of the above-mentioned conventional circumstances, and it is an object of the present invention to provide a solid heat storage material that includes a $VO_2$-based inorganic material, is easy to sinter, has a high latent heat storage capacity, and can be suitably used as a phase change solid heat storage material, and a method of manufacturing the same.

Solutions to Problems

A powder material for sintering of a first aspect of the present invention includes vanadium and oxygen and includes a vanadium oxide represented by the chemical formula $VO_2$ and at least one other type of vanadium oxide, in which, when the molar ratio of V to O in all the powder is expressed as 1:(2+d), d is in the range of $0<d<0.5$.

In addition, a solid latent heat storage sintered member of the first aspect of the present invention is obtained by sintering the powder material for sintering of the first aspect of the present invention.

This solid latent heat storage sintered member includes a plurality of types of vanadium oxides, and the proportion of the weight of $VO_2$ oxide in all the vanadium oxides, which is determined by phase identification using X-ray diffraction, is preferably 95% or more and less than 100%. In this case, it is more preferable that the member includes a foam-like pattern structure inside. Here, the foam-like pattern structure refers to a structure in which a small bubbly pattern is observed on the surface of the crystal when observed with a scanning electron microscope. The present inventors have clarified that, when a foam-like pattern structure is observed in the structure, a relative density of 90% or more can be obtained, and the latent heat value is 200 J/cc or more, which are excellent characteristics as a latent heat material. In particular, by setting the value of d in the range of $0.0025 \le d \le 0.05$, the latent heat value becomes 220 J/cc, which is comparable to the phase transition latent heat of vanadium dioxide.

A powder material for sintering of a second aspect of the present invention contains vanadium and oxygen as main components, and includes a $VO_2$-based vanadium oxide and one or more types of vanadium oxides other than the $VO_2$-based vanadium oxide, the $VO_2$-based vanadium oxide containing an oxide as one component obtained by partial substitution of V of an oxide represented by the chemical formula $VO_2$ with one or more elements of W, Cr and Al, and having a proportion of the partial substitution of more than 0 atomic % and 20 atomic % or less, in which, when the ratio of the sum of atomic % of the vanadium and the one or more substitution elements to the atomic % of the oxygen in all the powder is expressed as 1:(2+d), d is set to $0<d<0.1$.

In addition, a solid latent heat storage sintered member of the second aspect of the present invention is obtained by sintering the powder material for sintering of the second aspect of the present invention.

In the solid latent heat storage sintered member prepared in the above way, the amount of heat storage per volume can be as large as 100 J/cc or more and 250 J/cc or less, which is comparable to the amount of heat storage of powder $VO_2$. In addition, the density as a bulk body is also improved, and the relative density p based on the density as a physical property value of $VO_2$ can be $80\% \le \rho < 100\%$. Such a high-density member exhibits good mechanical characteristics.

The above solid latent heat storage sintered member includes a plurality of types of vanadium oxides, one of which is an oxide obtained by substituting a part of V of an oxide represented by the chemical formula $VO_2$ with one or more elements of W, Cr and Al. The proportion of the weight of the partially substituted $VO_2$ oxide in the total vanadium oxides, which is determined by phase identification using X-ray diffraction, is preferably 95% or more and less than 100%. In this case, it is more preferable that the member includes a foam-like pattern structure inside.

Advantageous Effects of Invention

A powder material for sintering and solid latent heat storage member of the present invention include a $VO_2$-based inorganic material, is easy to sinter, has a high latent heat storage capacity, and can be suitably used as a phase change solid heat storage material.

DESCRIPTION OF EMBODIMENTS

Figure 1:
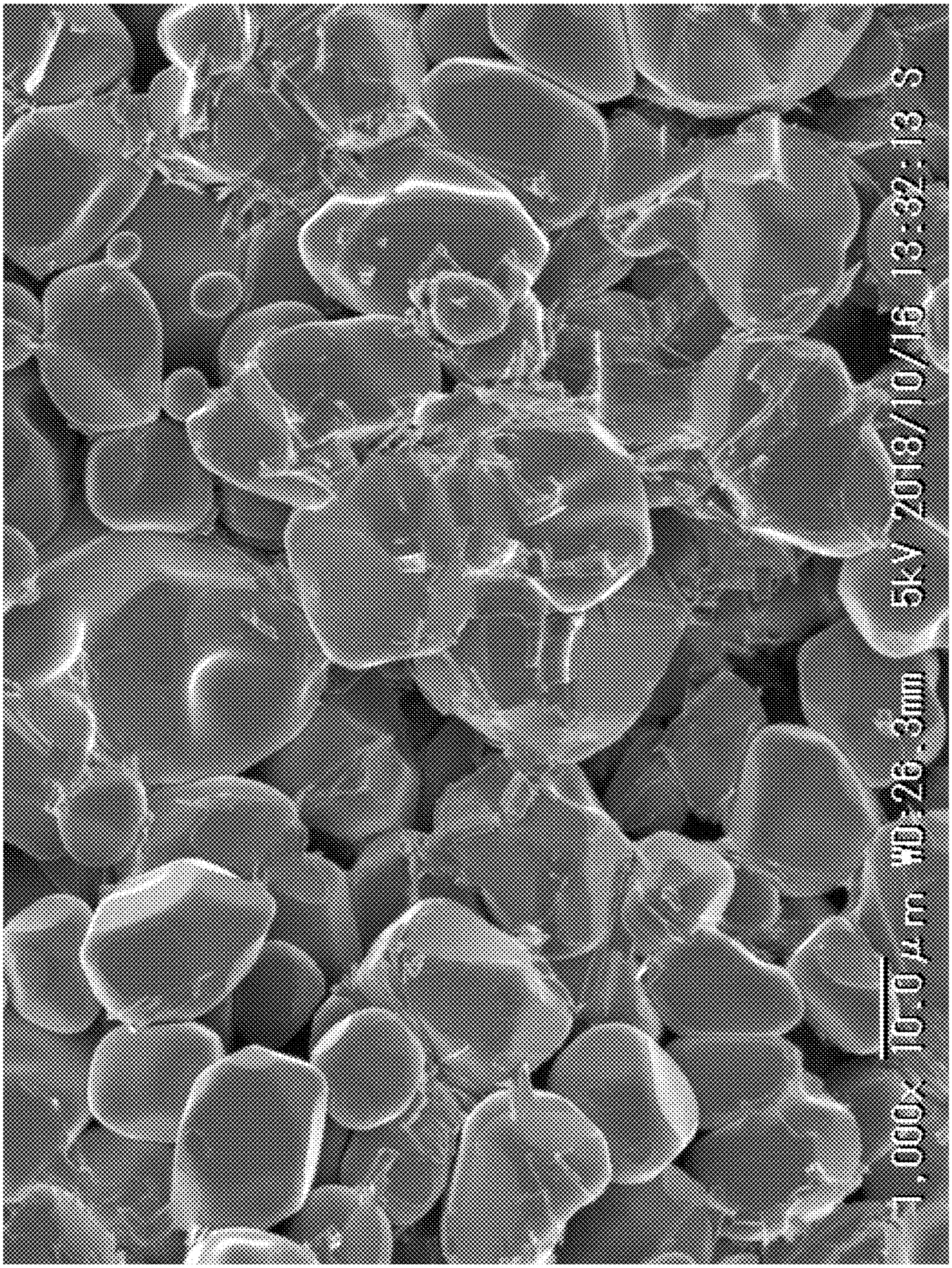
FIG. 1 is a scanning electron micrograph showing the structure of a sintered member obtained in Example 1.

Hereinafter, embodiments of the present invention will be described.

A powder for sintering of a first aspect of the present invention is a powder including vanadium V and oxygen O, having an oxide composed of the chemical formula $VO_2$ as one component, and coexisting with one or more other types of vanadium oxides, in which when the molar ratio of V to O in all the powder is expressed as 1:(2+d), d is in the range of $0<d<0.1$.

As expressed by the above element ratio in all the powder, a plurality of V-oxides containing a V-metal or $VO_2$ can be mixed. In addition, by oxidation of the V-metal or oxidation or reduction of the V-oxides, a mixture having $VO_2$ as a main component and having an element ratio in all the powder adjusted to the above ratio can be synthesized.

When d is in the range of $0<d<0.5$ in the above expression for the element ratio, the sintered powder shows good mechanical characteristics and heat storage characteristics. In other words, because the heat storage capacity and the mechanical strength tend to have opposite dependence on the d value, in order to achieve both the heat storage capacity and the mechanical strength above a certain level, d is more preferably in the range of $0<d<0.1$, and still more preferably $0.005 \leq d \leq 0.02$.

A description will be made below for an example of constitution of sintering and molding of a solid latent heat storage member including the powder for sintering of the present disclosure.

The sintering and molding of the solid latent heat storage member including the powder for sintering of the present disclosure can be performed by the following steps.

Powder Synthesis Step

A mixture including an oxide composed of the chemical formula $VO_2$ as one component and coexisting with one or more other types of vanadium oxides is formed, and, when the ratio of both elements V:O in all the powder is expressed as 1:(2+d), d is adjusted to a suitable value.

Sintered Body Forming Step

Next, the mixed powder obtained in the powder synthesis step is sintered.

In a first embodiment of the powder synthesis step, $VO_2$ and $V_2O_5$ are weighed and mixed so that the V:O ratio in all the mixed powder after mixing is a ratio such that, in the expression of 1:(2+d), d is a desired value. A method of producing the $VO_2$ and $V_2O_5$ powders as a starting material is not particularly limited, and for example, a commercially available reagent may be used. The size of the powder particle is also not particularly limited, but in order to make the dispersibility of both vanadium oxides uniform during mixing and to proceed with sintering using the mixed powder better, a publicly known means such as mechanical milling may be used before weighing to reduce the powder particle size to 1 μm or less. In addition, any publicly known means can be used for mixing the powders after weighing, but for example, when adjusting the particle size of the starting material by mechanical milling, the weighed $VO_2$ and $V_2O_5$ are fed into the milling pot to be able to adjust the particle size and promote mixing at the same time.

In a second embodiment of the powder synthesis step, using $VO_2$ as a starting material, its temperature is raised to a set temperature in the air, and annealing is performed for a certain period of time to convert a part of $VO_2$ into a $VO_2$+n compound containing more oxygen, thus adjusting the ratio of V:O of all the oxides in the mixed state to a ratio such that, in the expression of 1:(2+d), d is a desired value. A method of producing $VO_2$ as a raw material is not particularly limited, and a commercially available reagent can also be used. The $VO_{2+n}$ compound generated during annealing is not limited to one type, and if one or more types having a value of n of $0<n \leq 0.5$ exist in the phases shown on the phase diagram, the desired d value can be attained. In addition, for annealing in the air, any publicly known means can be used for a method of raising the temperature, and further, the set temperature and holding time are not particularly limited.

In addition, the particle size of the starting material is also not particularly limited, but if it is pulverized to very fine particle size, it will hinder handling of subsequent collection and powder compaction and the like, and if the particle size is too large, it is generally known that extra time is required for bonding of oxide particles and grain growth. Therefore, the range of average Feret diameter $\lambda_f$, which is obtained by measuring Feret diameters of obtained powder particles from an image for the particles observed with a scanning electron microscope, is preferably $0.5\ \mu m \leq \lambda_f \leq 3\ \mu m$, more preferably $1\ \mu m \leq \lambda_f \leq 3\ \mu m$, and still more preferably $1\ \mu m \leq \Delta_f \leq 2\ \mu m$.

A mixed powder material for sintering obtained by the first embodiment or the second embodiment can be sintered by any publicly known method, and for example, a sintered bulk member can be obtained by the following procedure. For example, by carrying out the following steps as a first aspect of sintering, it is possible to form a solid heat storage bulk member having heat storage characteristics equivalent to those of powder $VO_2$ and good mechanical characteristics.

Powder Compaction Molding Step

A mixed powder obtained in the powder synthesis step is compressed by a press or the like and molded into a pellet. In the powder compaction molding step, the molding method is not particularly limited, and a powder compaction molded body can be obtained by filling a mold with the mixed powder and pressurizing it. Specifically, for example, after the mixed powder is fed into a cemented carbide die, the upper and lower parts are closed with punches, and a load is applied to the punches with a hydraulic press to obtain a pellet-shaped powder molded body. The load (pressure) applied during molding is not particularly limited. When the load is large, a high-density state with a small porosity can be obtained in a member after sintering, but if it is too large, strain remains even after sintering, which adversely affects the phase change that causes heat storage. Therefore, it is preferable to select the molding pressure depending on the material of the punch or die used and the density required after sintering. For example, when molding about 1 g of the starting powder material with a cemented carbide die (through hole diameter 8 mm), the powder is put into the through hole of the die, which is then sandwiched with the cemented carbide punches with a diameter of 8 mm inserted from above and below, and a load of about 2.5 kN is applied to the upper and lower punches with a hydraulic press to be able to mold a pellet that can be handled in the subsequent steps.

Sintered Body Forming Step

The compression-molded pellet is vacuum-sealed in a quartz tube, and the temperature of the pellet is raised to a treatment temperature of 600° C. or higher and 1000° C. or lower to proceed with powder sintering inside the powder compaction molded pellet.

In the sintered body forming step, by raising the temperature of the powder compaction molded pellet in a vacuum atmosphere, the sintering can proceed by diffusion of the powder particles without changing the oxidized state of the oxides constituting the starting material. The means for raising the pellet temperature in a vacuum atmosphere is not particularly limited, but for example, as the sintered body forming step, a powder-compacted pellet is vacuum-sealed inside a quartz tube to produce an ampoule, which is then placed in an electric furnace, and the temperature is raised, thus being able to carry out sintering in a vacuum atmosphere. For the above step, the degree of vacuum in the quartz tube for the sealing is not particularly limited, but if the degree of vacuum is worse than $1\times10^{-2}$ Pa, oxygen and water remain in the chamber to the extent that they affect the sintering reaction, which is not preferable. The degree of vacuum is therefore preferably $1\times10^{-2}$ Pa or less. In addition, in order to attain a vacuum higher than $1\times10^{-3}$ Pa, a non-general-purpose evacuation system having high capacity is required, and therefore $1\times10^{-3}$ Pa or more is preferable. In particular, $5\times10^{-3}$ Pa or more is practical as vacuum reaching.

Although it is described here that the ampoule of the vacuum-sealed quartz tube and the electric furnace are combined, for example, the powder-compacted pellet can be heated to proceed with sintering with an electric furnace capable of evacuating the space for heating the sample. In this case, the sample heating space of the electric furnace can be evacuated to obtain a desired degree of vacuum before the temperature rise of the electric furnace is started.

Then, by setting the heat treatment temperature to 670° C. or higher and 1050° C. or lower, the sintering reaction proceeds, and a sintered body can be formed. In the case of the mixed powder in the first embodiment of the above-described powder synthesis embodiment, at 670° C. or higher, $VO_2$ is a solid, but $V_2O_5$ becomes a liquid because the temperature exceeds its melting point. Therefore, the gap between the solid phase $VO_2$ powder particles is filled with the liquid phase $V_2O_5$, and thus the denseness is improved. Further, according to the phase diagram, when the solid phase $VO_2$ and the liquid phase $V_2O_5$ are in contact with each other, an equilibrium state between both phases is attained, and therefore a reaction represented by the following general formula: Formula 1 occurs while sintering proceeds.

[Chem. 1]

$$2V_2O_5 \rightleftharpoons 4VO_2 + O_2$$

On the right side of the above formula, when the oxygen molecule $O_2$ dissipates as a gas from a part where the equilibrium is attained, the reaction proceeds unilaterally to the right side, thereby the liquid phase $V_2O_5$ becomes solid phase $VO_2$ over time. In the sintered body forming step, the voids of the $VO_2$ powder that existed at the start of the heat treatment are filled with the liquid phase $V_2O_5$, but when the liquid phase $V_2O_5$ comes into contact with $VO_2$ and the equilibrium on the phase diagram is attained, $O_2$ easily separates from the pellet, since the temperature is raised in the vacuum atmosphere as described above. Thus, the liquid phase $V_2O_5$ that has permeated the voids begins to change to solid phase $VO_2$, and as a result, the voids between the $VO_2$ powder particles that existed at the start are filled with solid phase $VO_2$. Therefore, in a bulk member obtained through the sintered body forming step in the first embodiment of sintering, a change in latent heat per volume equivalent to that in the case of $VO_2$ alone can be obtained, and bonding between $VO_2$ powder particles sufficiently advances, causing grain growth, whereby the mechanical strength as a bulk member increases.

Further, as a second embodiment of sintering, pressurized sintering can be used, but a method of the pressurized sintering is not particularly limited, and for example, an electric current sintering method or a hot press method can be used. In the case of electric current sintering, a synthesized powder is put into a die made of a conductive material such as graphite and sandwiched between punches also made of a conductive material such as graphite, which is then set between the pressurizing rams of an electric current sintering apparatus. The pressurizing rams can apply a predetermined load to the upper and lower punches, and further apply a voltage to generate a current up to $10^3$ A order between the upper and lower punches, and thereby the temperature is raised by Joule heat due to current application to the die, punches, and powder to be able to advance sintering under pressure. For the above method, the atmosphere for sintering is not particularly limited, but pressurized sintering may be carried out in a vacuum atmosphere by providing an evacuation function to the chamber surrounding the rams for pressurization/current application. The ultimate vacuum in the chamber is not particularly limited, but when the evacuation is continued even while the sintering step proceeds, the residual moisture and residual oxygen in the chamber can be reduced to the extent that they do not affect the sintering by keeping the vacuum higher than 10 Pa. In addition, because the apparatus chamber cannot be made smaller than the space required to set the pressurizing/current application rams and the mold composed of punches and dies between the rams, in order to attain a vacuum higher than 1 Pa, a special evacuation system having a high capacity is required. Therefore, 1 Pa or more is preferable. In particular, 5 Pa is practical as vacuum reaching.

The load (pressure) applied between the upper and lower rams during the pressurized electric current sintering is not particularly limited. When the load is large, a high-density state with a small porosity can be obtained in a member after sintering, but if it is too large, strain remains even after sintering, which adversely affects the phase change that causes heat storage. Therefore, it is preferable to select the molding pressure depending on the material of the punch or die used and the density required after sintering. For example, when molding about 1 g of the starting powder material with a graphite die (through hole diameter 10 mm), the powder may be put into the through hole of the die, which may then be sandwiched with cemented carbide punches with a diameter of 10 mm inserted from above and below, and a load of about 1 kN may be applied to the upper and lower punches with a hydraulic press. In addition, regarding the temperature rise by current application, there is also no particular limitation on the applied voltage, current, or temperature control. A current may be applied so that the current reaches the set value, and the temperature may be measured, or the temperature on the side of the die is observed with a radiation thermometer, and the temperature during sintering and the holding time at that temperature may be controlled in combination with a publicly known PID control method. Then, by setting the heat treatment temperature to 670° C. or higher and 1050° C. or lower, the sintering reaction proceeds, and a sintered body can be formed. In the case of the mixed powder in the first embodiment of the above-described powder synthesis embodiment, at 670° C. or higher, $VO_2$ is a solid, but $V_2O_5$ becomes a liquid because the temperature exceeds its melting point. Therefore, the gap between the solid phase $VO_2$ powder particles is filled with the liquid phase $V_2O_5$, but at this time, since the load from the rams is applied through the upper and lower punches, $O_2$ appearing on the right side in the reaction of Formula 1 is expelled, the change of liquid phase $V_2O_5$ to solid phase $VO_2$ advances, and sintering advances. Therefore, in a bulk member obtained through the pressurized sintering as the second embodiment of the sintered body forming step, latent heat change per volume equivalent to that in the case of $VO_2$ alone can be obtained, and the mechanical strength of the bulk member is increased by sufficiently advancing bonding between $VO_2$ powder particles and causing grain growth.

Since the reaction of Formula 1 is proceeding, the proportion of $VO_2$ with respect to the bulk member obtained increases as compared with the composition ratio immediately after the powder synthesis step, and a phase change heat storage member thus obtained exhibits heat storage operation resulting from the latent heat at the same temperature as the phase transition temperature Tp of $VO_2$. In order to control the operation temperature, a part of the V element of $VO_2$ used in the powder synthesis step may be substituted with an element other than V. As the substitution element, for example, one or more of W, Cr, and Al, which are known for effectiveness for controlling Tp of $VO_2$, are selected, whereby the operation temperature of a heat storage member obtained by the disclosed technique can also be controlled. When the atomic molar ratio of V to the partial substitution element is shown as (1−x): x, a preferred range of x is $0<x\leq 0.2$. For example, when x=0.03 holds for W, the operation temperature can be lowered to about −20° C., and when x=0.2 holds for Cr, the operation temperature can be raised to about 180° C. Because increase of the amount of substitution decreases the amount of latent heat, a range is more preferably $0<x\leq 0.15$, and still more preferably $0.01\leq x\leq 0.15$, which allows control of the operation temperature range while maintaining a relatively large amount of latent heat.

In the bulk heat storage member prepared as described above, the amount of heat storage per volume can be set to a quantity of 100 J/cc or more to 250 J/cc or less, which is comparable to the amount of heat storage of powder $VO_2$. In addition, the density as a bulk body is also improved, and the relative density p based on the density as a physical property value of $VO_2$ can be $80\%\leq \rho<100\%$. Such a high-density member exhibits good mechanical characteristics.

EXAMPLES

Specific examples will be described below, but the present invention is not limited to these examples.

Example 1

In Example 1, a sintered member was produced by the following procedure, from powder synthesis through a sintered body forming step.

<Powder Synthesis Step>

Commercially available $VO_2$ (manufactured by Kojundo Chemical Laboratory Co., Ltd., purity 99.9%) and $V_205$ (manufactured by Kojundo Chemical Laboratory Co., Ltd., purity 99.9%) were weighed so that the ratio of the weights $w[V_2]$ and $w[V_2O_5]$ was 95:5, and the total weight was adjusted to 40 g, which were then fed into a mechanical milling pot. Subsequently, 30 ml of ethanol was fed into the pot that was then tightly sealed, and planetary motion (rotation speed 400 rpm) milling was carried out for 1 hour to advance pulverizing and mixing. A suspension containing the mixed powder was obtained from the pot after milling, which was then dried with an evaporator to collect the mixed powder. The collected mixed powder was observed with a scanning electron microscope SEM (VE-8800 manufactured by KEYENCE CORPORATION), and no particle with a Feret diameter exceeding 3 μm was observed from visual observation of the image, and the proportion of the number of particles with a Feret diameter of 2 μm or less was 95% in the field of view. Assuming that the ratio V:O of both elements in all the mixed powder is 1:(2+d), the d value calculated from the above-described weight ratio is 0.023.

<Sintering Step>

The mixed powder obtained as described above was subjected to the powder compaction molding step and the sintered body forming step shown below to obtain a sintered member.

Powder Compaction Molding Step

First, 0.3 grams of the mixed powder was fed into the through hole (diameter 8 mm) of a cemented carbide die, sandwiched between punches with a diameter of 8 mm from above and below, and a uniaxial load of about 5 kN was applied to the upper and lower punches with a hydraulic press to mold a pellet.

Sintered Body Forming Step

After putting the pellet into a quartz tube with one end sealed, the inside was evacuated to $5\times 10^{-3}$ Pa, and then the evacuation port side was sealed up with a burner to form a quartz ampoule. The produced vacuum ampoule was placed inside a muffle furnace, and the temperature was raised to a heat treatment temperature of 800° C. in 1 hour from the start of the temperature rise and then held at the heat treatment temperature for 1 hour. After the holding, the input current to the heating element of the furnace was returned to 0 within 1 minute to stop the heat input, and the cooling rate of the ampoule followed the natural cooling of the furnace body. The ampoule was taken out from the furnace, and the outer quartz tube was crushed to obtain a sintered member.

Example 2

Powder Preparation Step

A mixed powder was obtained by the same procedure as in Example 1 except that the ratio of the weights $w[VO_2]$ and $w[V_2O_5]$ was 90:10. Assuming that the ratio V:O of both elements in all the mixed powder is 1:(2+d), the d value calculated from the above weight ratio is 0.046.

Sintering Step

A sintered member was obtained by the same procedure as in Example 1 except that, in the sintered body forming step, before placing a quartz ampoule in the furnace, the temperature inside the furnace is raised to 680° C., and the ampoule is placed in the furnace, held for 1 hour, and then taken out of the furnace and air-cooled.

Comparative Example 1

In order to compare the sintered structures, a sintered member was obtained as Comparative Example 1 by the following steps.

Powder Preparation Step

An unmixed $VO_2$ powder was obtained by the same procedure as in Example 1 except that the ratio of the weights $w[V_2]$ and $w[V_2O_5]$ was set to 100:0 and the d value was set to 0. The above powder may have generated $V_2O_5$ by oxidation on the surface that was caused by adsorption of oxygen and water due to air exposure. In order to completely remove the $V_2O_5$ on the surface, the $VO_2$ powder was vacuum-sealed by the same means as in the producing of the quartz ampoule of Example 1 without powder compaction and was hold at 600° C., which is below the melting point of $V_2O_5$, for 1 hour. According to the literature (Catalysis Letters, vol. 83 (2002), pp. 115-119), only surface $V_2O_5$ is removed by such treatment. For the $VO_2$ powder obtained after such treatment, a surface inclusion was identified by electron beam scattering observation with a transmission electron microscope TEM, and it was confirmed that the $V_2O_5$ was removed by heat treatment at 600° C. for 1 hour in vacuum.

Sintering Step

A sintered member as Comparative Example 1 was obtained through the same powder compaction molding step and sintered body forming step as in Example 1.

Evaluation (Structure Observation)

Figure 2:
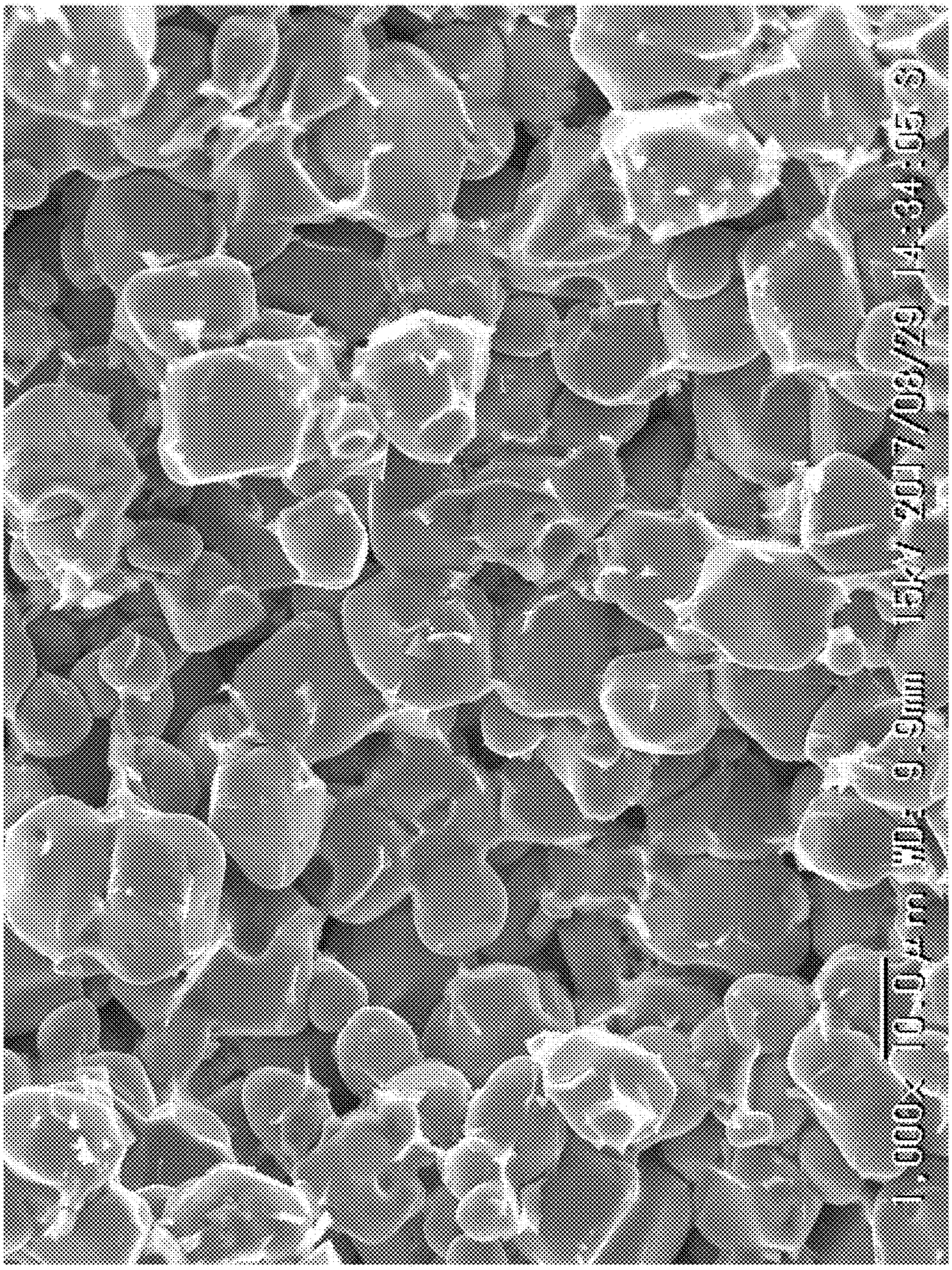
FIG. 2 is a scanning electron micrograph showing the structure of a sintered member obtained in Example 2.
Figure 3:
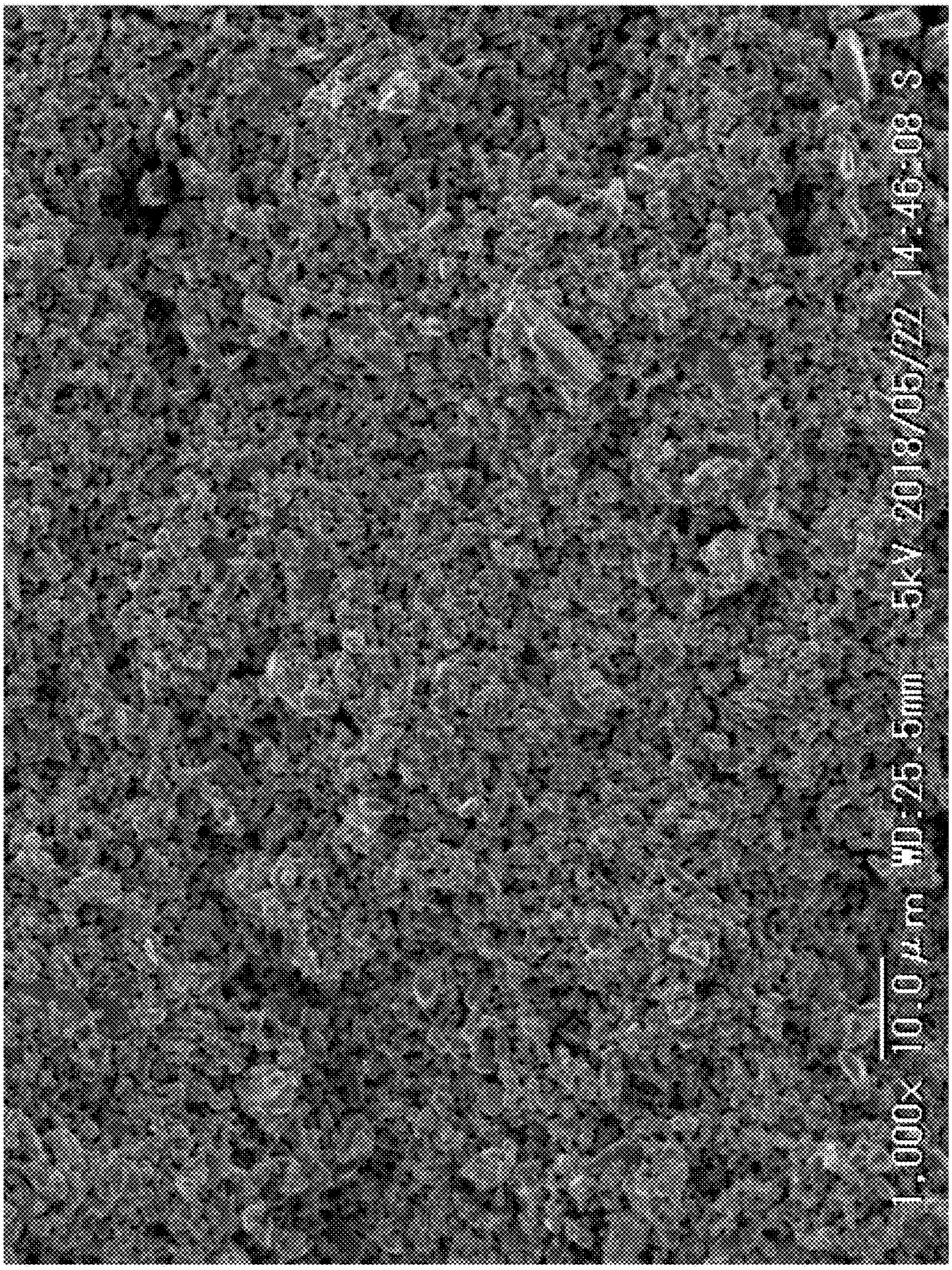
FIG. 3 is a scanning electron micrograph showing the structure of a sintered member obtained in Comparative Example 1.

In order to observe the sintered structures of the sintered members obtained as Examples 1 and 2 and Comparative Example 1, sintered members were broken by applying a bending load using a procedure with a combination of pliers and the like. The broken-out sections were observed with a scanning electron microscope SEM (VE-8800 manufactured by KEYENCE CORPORATION). Scanning electron micrographs for Examples 1 and 2 are shown in FIGS. 1 and 2, respectively. In the powder after milling, no particle with a Feret diameter of 3 μm or more was observed, but in FIG. 1, only a few grains with a Feret diameter of 10 μm or less are observed, and it is observed that grain growth clearly proceeded and an interparticle bonding called necking has been formed everywhere. In Example 2, since the time required to reach the holding temperature for sintering is short and the holding temperature is low as compared with those in Example 1, many grains having a slightly small Feret diameter are observed, but obviously, the grains grow more than the starting material powder obtained in the powder preparation step, and necking is observed everywhere as in Example 1. On the other hand, in an observation image obtained from Comparative Example 1 shown in FIG. 3, almost the whole area is composed of small grains of about 1 to 2 μm. Because a broken-out section can be seen in large grains that are partially observed, it is judged that the large grains are grains that were insufficiently crushed and accidentally added during milling. In other words, it can be seen that grain growth is hardly attained in Comparative Example 1.

<Comparison of Powder Preparation>

As a second embodiment in the powder preparation step, sintered members of Examples 3 and 4 were obtained by the following methods.

Example 3

Powder Preparation Step

A commercially available $VO_2$ (manufactured by Kojundo Chemical Laboratory Co., Ltd., purity 99.9%) was used to prepare fine pulverized $VO_2$ powder by the same powder preparation step as in Comparative Example 1. Next, 1.5 grams of the powder obtained was laid on the bottom of a glass petri dish, which was then placed in a muffle furnace at room temperature, and the temperature was raised at a rate of 5° C. per minute in an air atmosphere. After the temperature inside the furnace reached 250° C., the temperature was held for 20 minutes, then the input current to the heating element of the furnace was returned to 0 in a few minutes to stop the heat input, and the powder was collected from the glass petri dish immediately after the temperature in the furnace returned to room temperature. From a thermogravimetric change measurement carried out separately, it was confirmed that the weight of the $VO_2$ powder gradually started to increase due to oxidation when the temperature was raised to 250° C. or higher in the air atmosphere. A d value calculated from the amount of oxidation by holding the $VO_2$ in the air atmosphere of 250° C. for 20 minutes is 0.01.

Sintering Step

A sintered member as Example 3 was obtained through the same powder compaction molding step and sintered body forming step as in Example 1.

Example 4

A sintered member as Example 4 was obtained by the same steps as in Example 3 except that, in the powder synthesis step, the holding time for the oxidation treatment at 250° C. in the air atmosphere was set to 40 minutes.

Structure Observation

Figure 4:
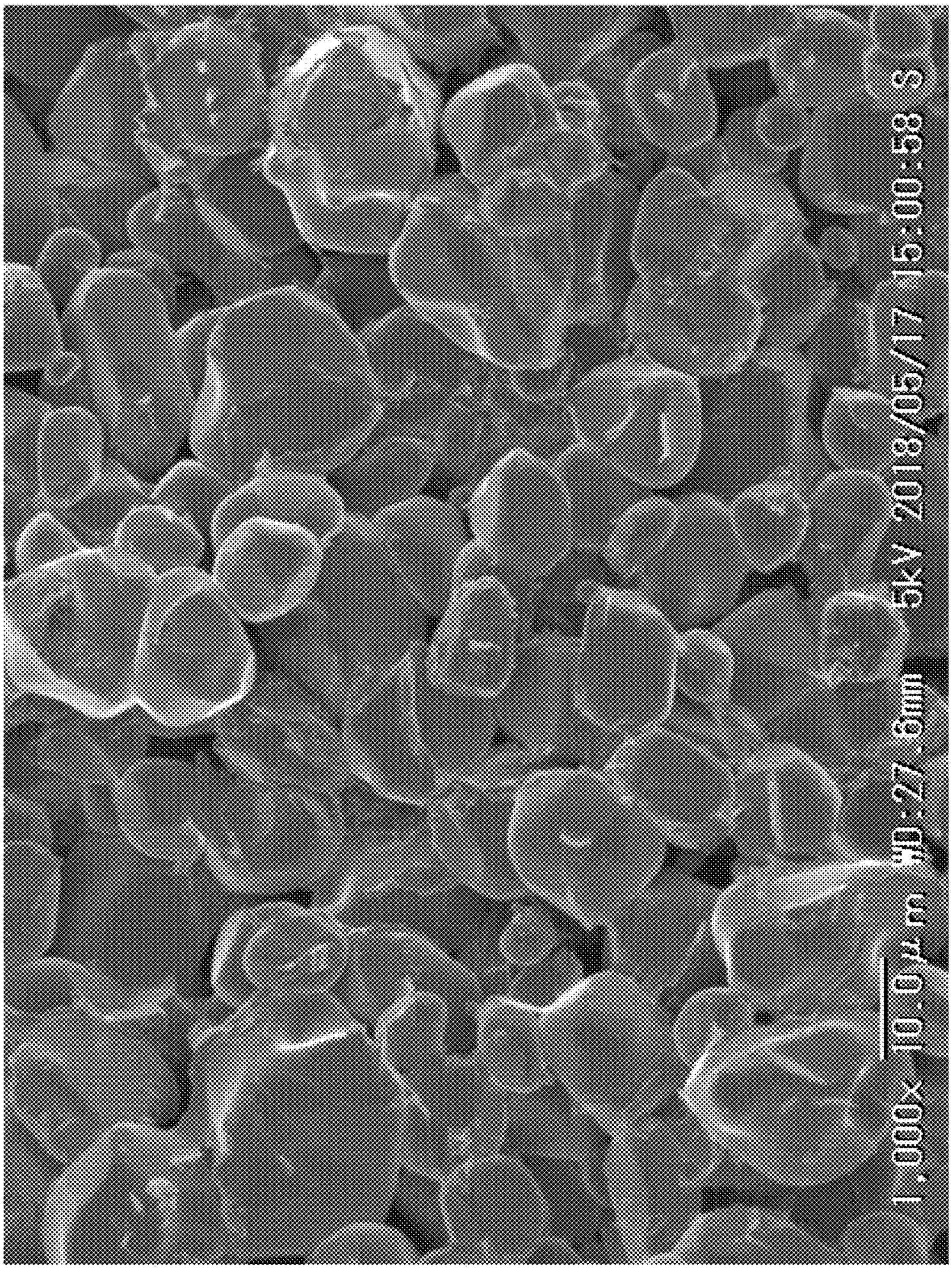
FIG. 4 is a scanning electron micrograph showing the structure of a sintered member obtained in Example 3.
Figure 5:
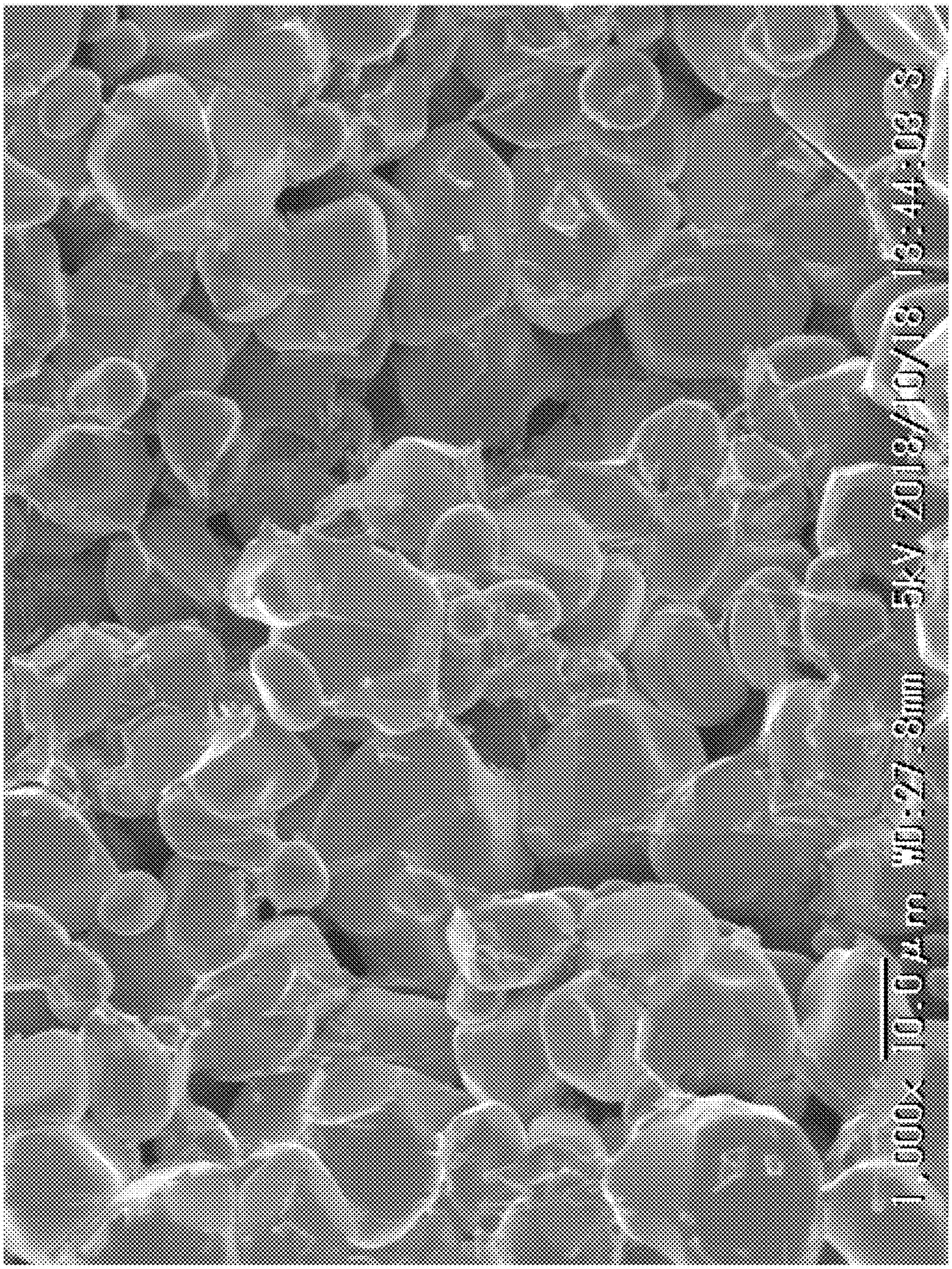
FIG. 5 is a scanning electron micrograph showing the structure of a sintered member obtained in Example 4.

The sintered members were broken by applying a bending load using a procedure with a combination of pliers and the like, and the broken-out sections were observed with a scanning electron microscope SEM (VE-8800 manufactured by KEYENCE CORPORATION). FIGS. 4 and 5 are observations of Examples 3 and 4, respectively. In both Examples, clear grain growth and occurrence of necking are observed as compared with the structure of Comparative Example 1.

<Comparison of Sintering Methods>

As the second embodiment in the powder preparation step, sintered members of Examples 5, 6, and 7 were obtained by the following methods.

Example 5

Powder Preparation Step

By the same method as in Example 1, the ratio of w[$V_2$] and w[$V_2O_5$] was adjusted to 95:5, and a mixed powder having a d value of 0.046 was prepared.

Sintering Step

Then, 1 gram of the mixed powder thus obtained was put into a graphite die with a through hole (diameter 10 mm), and carbon sheets having the same diameter as the hole were inserted into the hole in a lid shape from above and below, which was then wrapped with a carbon sheet in a single layer, sandwiched from above and below with graphite punches (diameter 10 mm) whose tolerance with the die hole was adjusted, and set between the pressurizing rams of an electric current sintering apparatus to apply a load of 5 kN. The chamber was closed and evacuated, and when the internal pressure reached 5 Pa or less, voltage application was started through the pressurizing rams. Using the temperature of the die surface measured by a radiation thermometer from the outside of the chamber through the window as an index of the sample temperature, the applied voltage was increased so that the increase in the sample temperature per minute was 200° C., and immediately after raising the temperature to 800° C., the applied voltage was returned to 0 to stop heating. Waiting for the sample temperature to be naturally cooled by heat conduction through contact between the pressurizing rams and the punches and to reach room temperature, the evacuation was stopped to take out the die from the chamber and take out, from the die, a sintered member as Example 5.

Example 6

A mixed powder was prepared by the same method as in Example 3 in the powder preparation step, and a sintered body as Example 6 was obtained by the same electric current pressurized sintering method as in Example 5 in the sintering step.

Example 7

A mixed powder was obtained by the same method as in Example 3 except that, in the powder preparation step, the holding time was set to 5 minutes and the d value was adjusted to 0.0025. A sintered body as Example 7 was obtained by the electric current pressurized sintering using the same method as in Example 5 except that, in the sintering step, the highest temperature in the temperature rise was adjusted to 670° C.

<Structure Observation>

Figure 6:
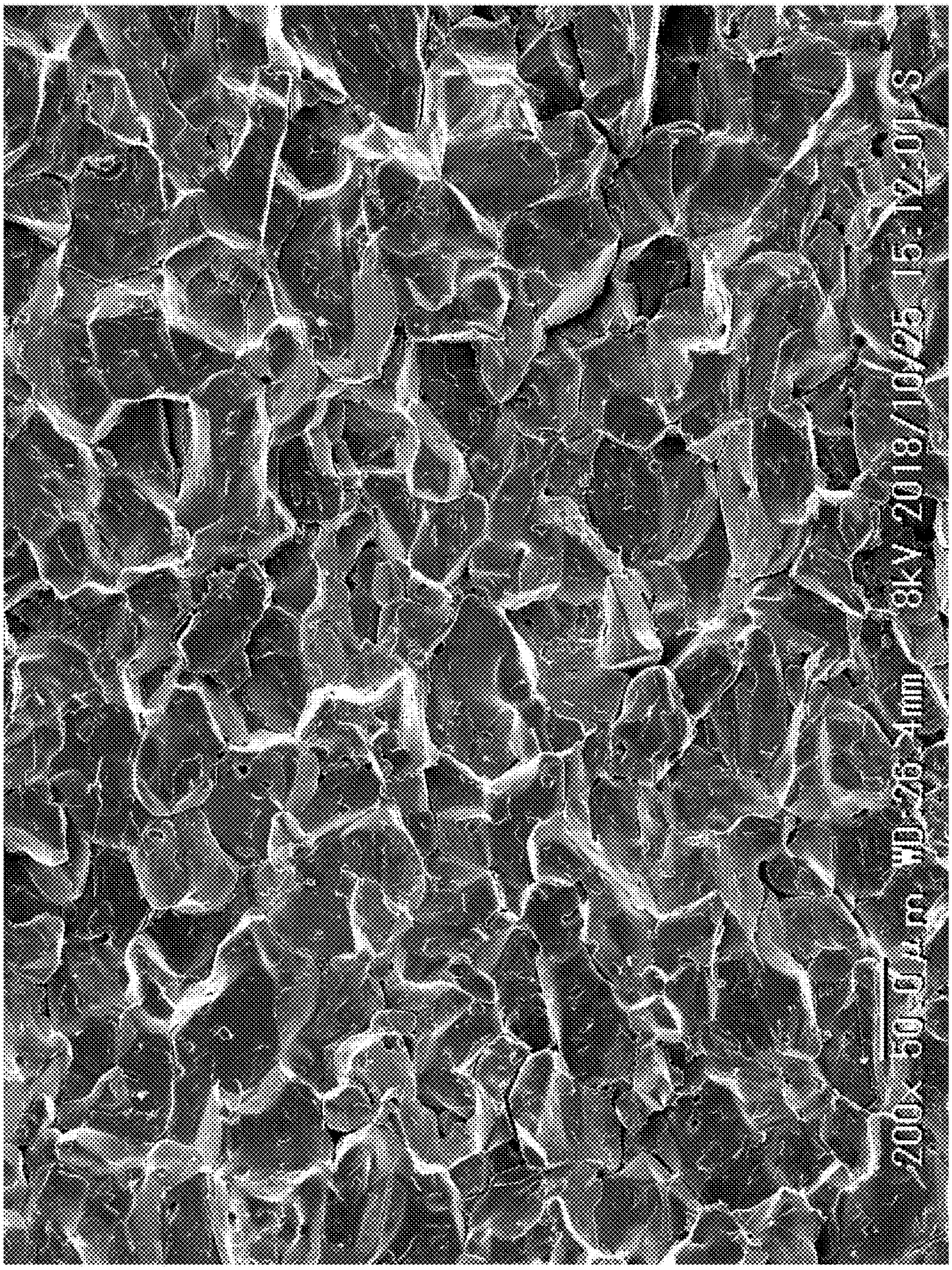
FIG. 6 is a scanning electron micrograph showing the structure of a sintered member obtained in Example 5.
Figure 7:
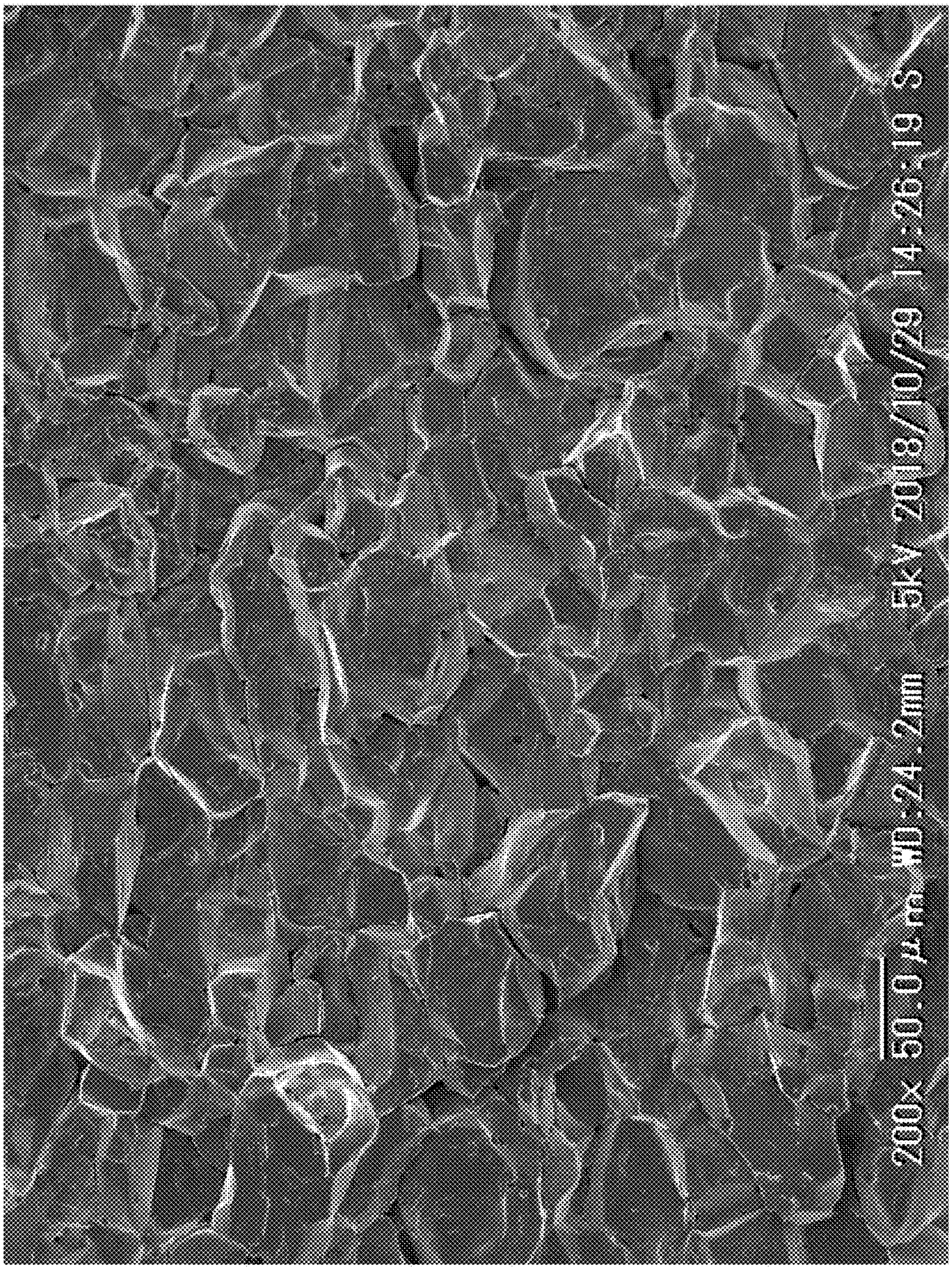
FIG. 7 is a scanning electron micrograph showing the structure of a sintered member obtained in Example 6.
Figure 8:
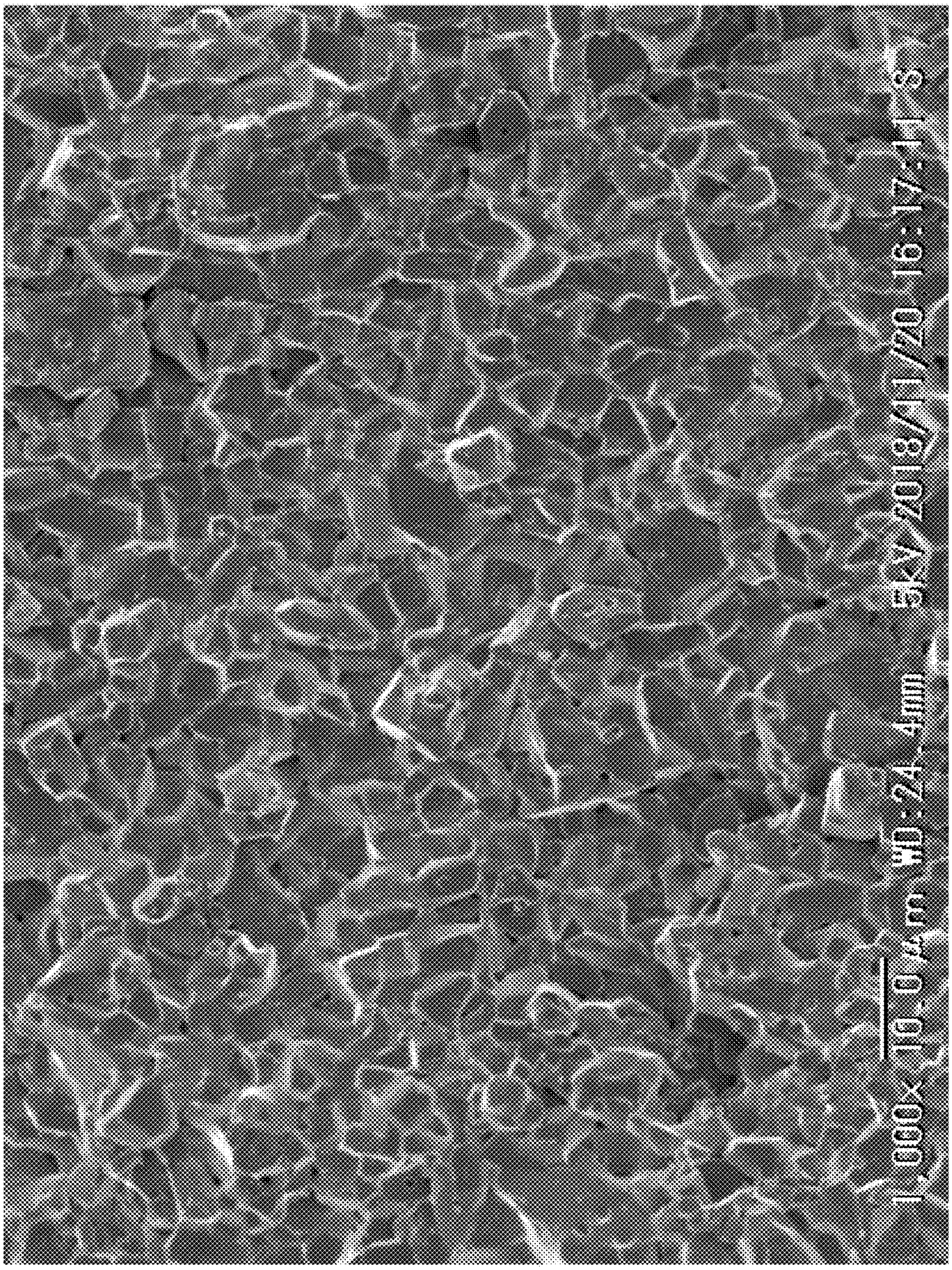
FIG. 8 is a scanning electron micrograph showing the structure of a sintered member obtained in Example 7.
Figure 9:
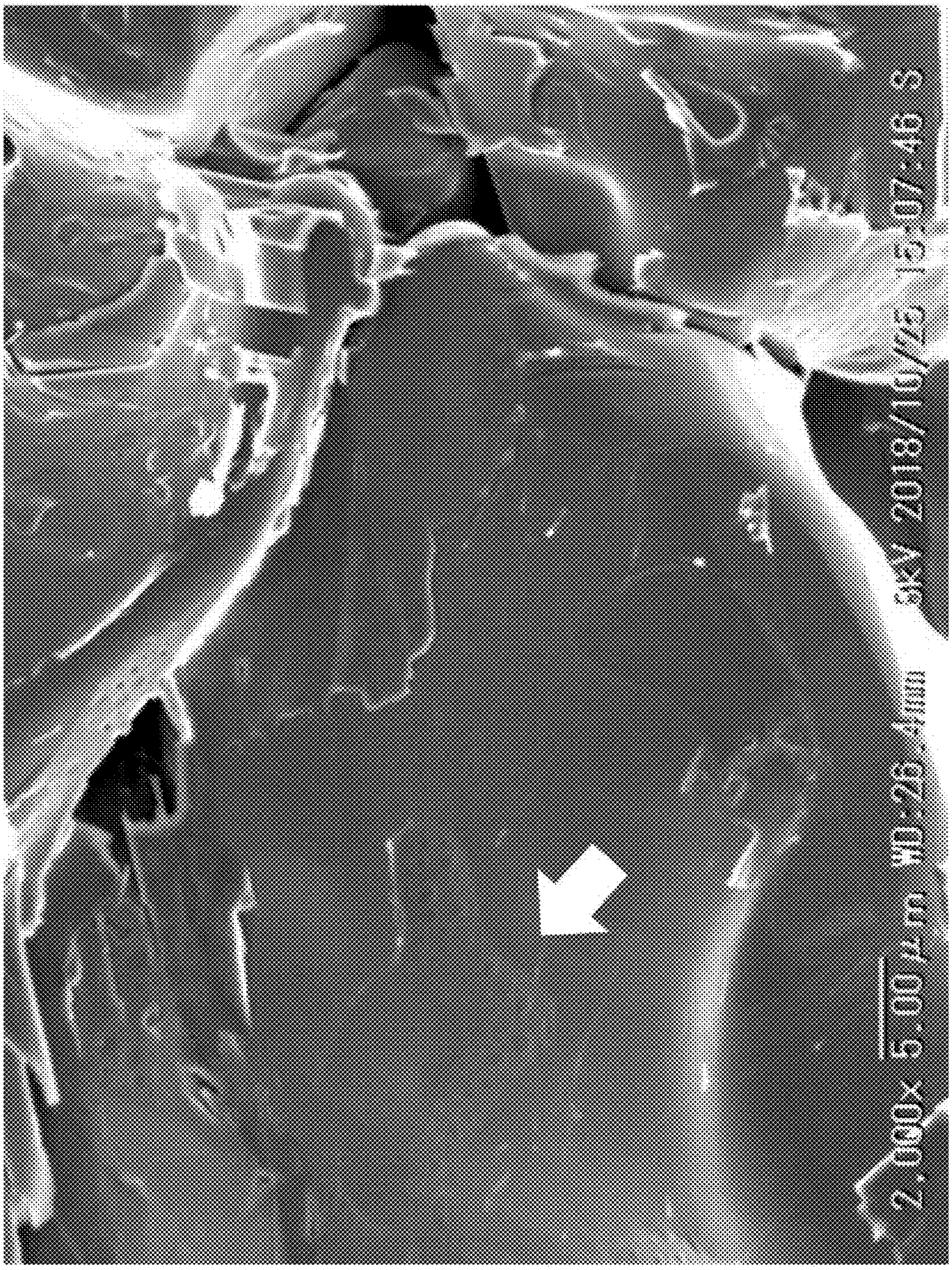
FIG. 9 is a scanning electron micrograph showing an enlarged structure of the sintered member obtained in Example 5.
Figure 10:
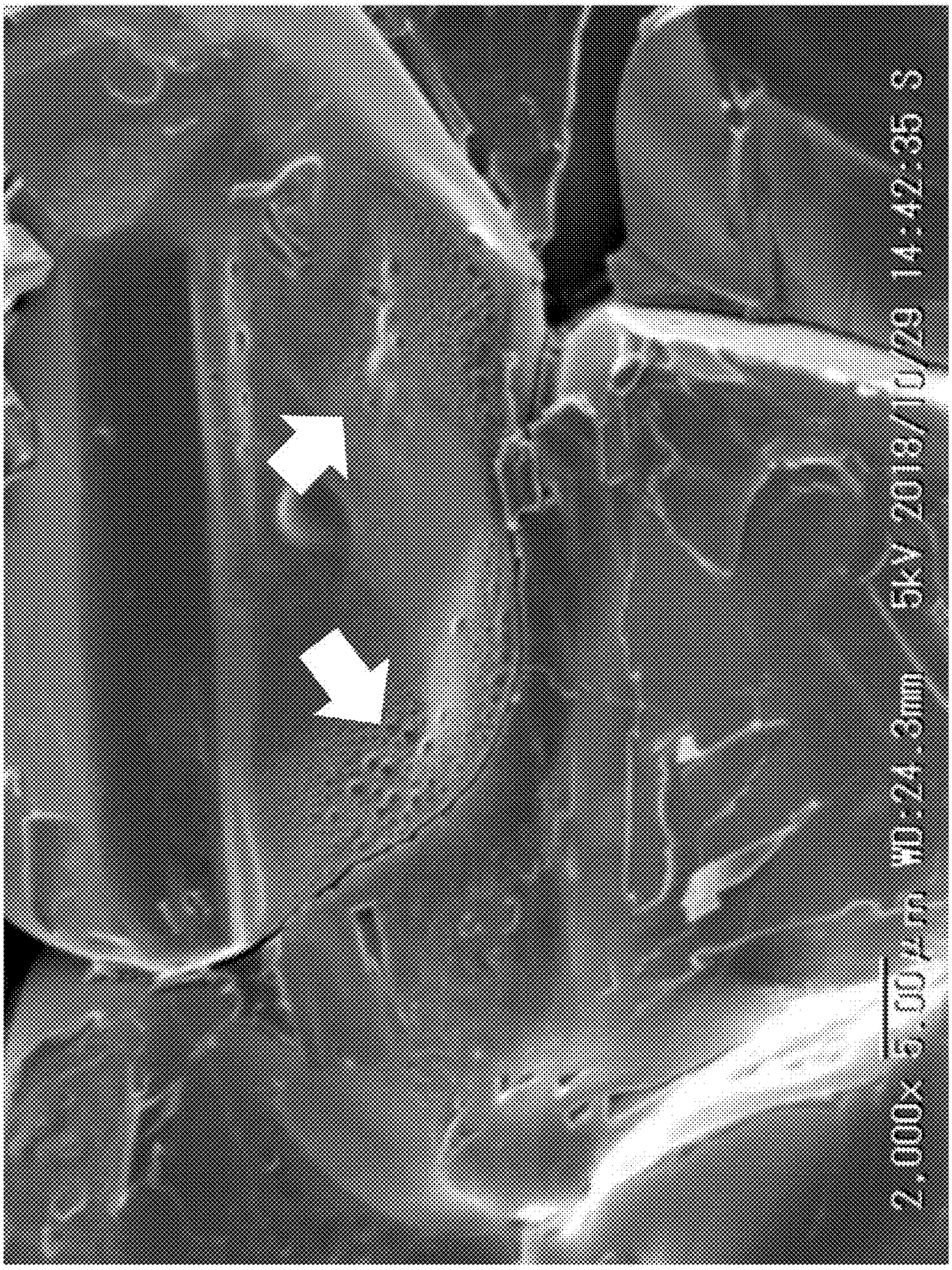
FIG. 10 is a scanning electron micrograph showing an enlarged structure of the sintered member obtained in Example 6.
Figure 11:
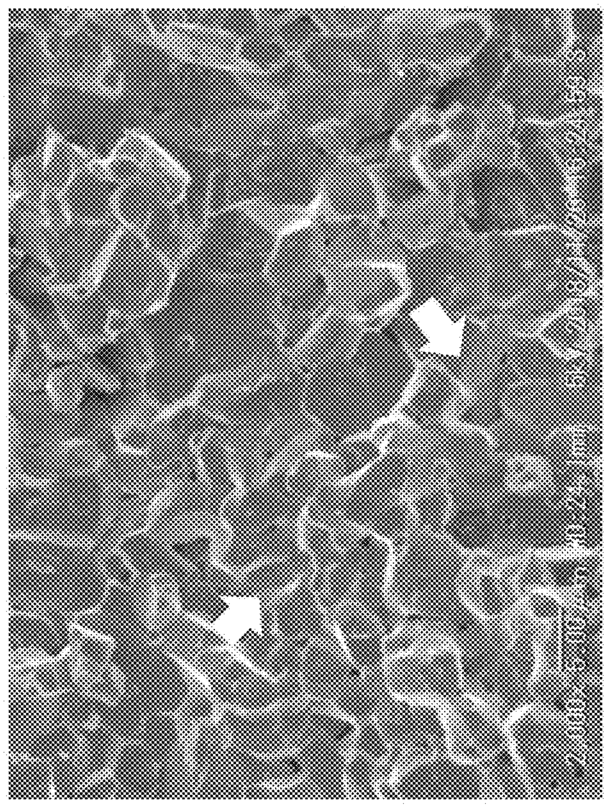
FIG. 11 is a scanning electron micrograph showing an enlarged structure of the sintered member obtained in Example 7.

The sintered members of Examples 5 to 7 were broken by applying a bending load using a procedure with a combination of pliers and the like, and the broken-out sections were observed with a scanning electron microscope SEM (VE-8800 manufactured by KEYENCE CORPORATION). FIGS. 6 and 7 are observations (200 magnifications) of Examples 5 and 6, respectively. As compared with Examples 1 and 3, which were powder-compacted before sintering and sintered in a quartz ampoule, bonding between particles clearly advances, and a single particle shape cannot completely be distinguished. The typical Feret diameter estimated from a portion surrounded by linear grain boundaries based on contrast difference between inside and boundary of a grain is about 50 μm in both Examples 5 and 6. It was confirmed that the grains grew further than the cases of Examples 1 and 3. In addition, although in Example 7, the d value is reduced in adjustment of the powder preparation step, and the highest temperature of the temperature rise in the sintering step is lowered in order to slow down the rate of grain growth, from the result of the same structure observation (1000 magnifications) with the scanning electron microscope, as shown in FIG. 8, it was observed that bonding between the particles sufficiently advanced while grain growth was suppressed. Further, when the observation with the scanning electron microscope was performed at a magnification of 2000, as seen in FIGS. 9, 10, and 11 (the tip of the arrow in each figure), it was observed that foam-like pattern structures were dotted in all Examples 5, 6 and 7.

Evaluation (Heat Storage Characteristics and Density Evaluation)

Figure 12:
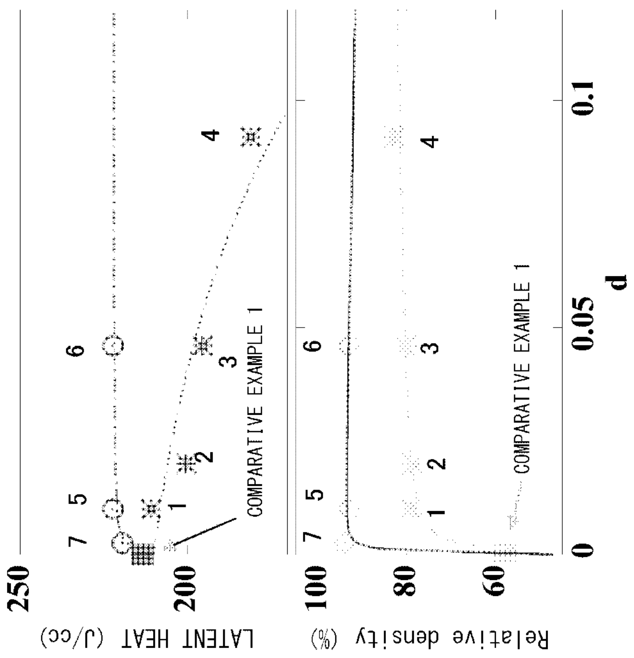
FIG. 12 is a graph showing changes in latent heat and relative density evaluated for Examples 1 to 7 and Comparative Example 1.

In order to evaluate heat storage characteristics, differential scanning calorimetry DSC (DSC6000 manufactured by Seiko Instruments Inc.) was performed for Examples 1 to 7 and Comparative Example 1. In addition, a density was calculated from a volume calculated by measuring a cylindrical sintered member produced as one of Examples 1 to 7 and the total weight of a sintered member weighed by an electronic balance, and a relative density value was estimated by comparison with the density of a vanadium dioxide compound (4.33 g/cc). The result of plotting the obtained measured values with respect to the d values is shown in FIG. 12. In Comparative Example 1, the relative density is about 50%, but in Examples 1, 2, 3, and 4 in which a powder-compacted pellet was vacuum-sealed in a quartz ampoule and sintered, the relative density of each sintered body increases to about 80%. The latent heat is 200 J/cc or more in the range of 0<d 0.05 and decreases slightly as d increases, but still has a large value of 180 J/cc at d=0.092. On the other hand, in Examples 5, 6, and 7 in which pressure was applied during sintering and a foam-like pattern structure was observed in the structure, a relative density of 90% or more was achieved for all Examples 5, 6, and 7, and the latent heat values were 200 J/cc or more. In particular, the latent heat values were 220 J/cc in the range of $0.0025 \leq d \leq 0.05$, which was comparable to the phase transition latent heat of vanadium dioxide.

Example 8

A sintered member of Example 8 was obtained in the same manner as in Example 5 except that, in the sintering step, regarding the temperature rise of the electric current pressurized sintering, the current application amount was set to 1000 A and the current application time was set to 12 seconds to rapidly raise the temperature to 690° C. without controlling the temperature rise rate, the prepared mixed powder used was 2 grams, and the load applied to the punches was 200 N.

Example 9

A sintered member of Example 9 was obtained in the same manner as in Example 7 except that, in the powder preparation step, the ratio of $w[V_2]$ and $w[V_2O_5]$ was adjusted to 90:10.

Example 10

A sintered member of Example 10 was obtained in the same manner as in Example 6 for the powder preparation and in the same manner as in Example 7 for the sintering step.

Comparative Example 2

A sintered member of Comparative Example 2 was obtained in the same manner as in Comparative Example 1 for the powder preparation step and in the same manner as in Example 7 for the sintering step.

<Compression Strength Evaluation>

For the sintered members of Examples 8 to 10 and Comparative Example 2 obtained as described above, the compression strength was measured with a universal testing machine (Shimadzu Corporation Autograph AGS-G) to evaluate the mechanical strength after sintering.

Figure 13:
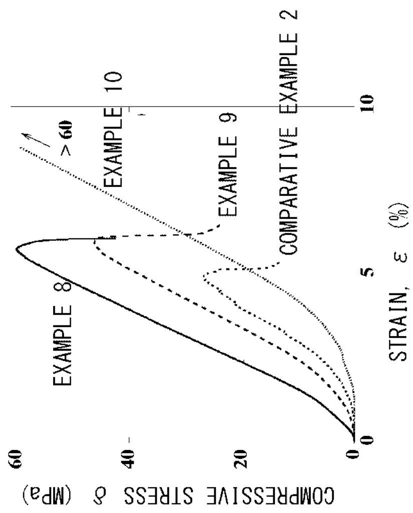
FIG. 13 is a graph showing stress-strain curves measured for Examples 8 to 10 and Comparative Example 2.

In the stress-strain curve of FIG. 13 in which the results of compression tests performed on Examples 8 to 10 and Comparative Example 2 are plotted, a point where the stress reaches its peak and begins to decrease is regarded as the start of buckling, and the maximum value of a point, immediately before the point of the start of buckling, where the curve shows a change in convexity upward was used as an index of the compression strength. In Comparative Example 2, buckling occurred at a compression strength of less than 30 MPa, but in Example 8, the compression strength at which buckling occurred improved to 60 MPa, and in Example 9, slightly decreased to 46 MPa, which is still larger than that of Comparative Example 2. In Example 10, buckling could not be observed because the upper limit of the stress that the universal testing machine used could generate was reached. Within the testable range, the stress increase accompanies the strain increase up to 60 MPa, and the compression strength is 60 MPa or more.

Effect of Adding Element

Based on the fact that a phase transition temperature of $VO_2$ can be controlled by an added element, in order to confirm that the present invention is effective even when an element is added to $VO_2$ used in the powder preparation step, Examples 11 and 12 shown below were produced, and structure observation, DSC measurement, and density calculation were performed.

Example 11

A sintered member of Example 11 was obtained by a method of the same powder preparation step and sintering step as in Example 6 except that, in the powder preparation step, Cr-added $VO_2$ (Smartec-HS120 manufactured by Kojundo Chemical Laboratory Co., Ltd.) whose phase transition temperature was adjusted to 120° C. was used. Note that, the amount of Cr substitution with respect to V, which is estimated from the phase transition temperature, is 0.10 atomic %.

Example 12

A sintered member of Example 12 was obtained by the same method as in Example 6 except that, in the powder preparation step, W-added $VO_2$ (Smartec-HS10 manufactured by Kojundo Chemical Laboratory Co., Ltd.) whose phase transition temperature was adjusted to 10° C. was used and, in the sintering step, the highest temperature was held for 1 hour. Note that, the amount of W substitution with respect to V, which is estimated from the phase transition temperature, is 0.023 atomic %.

(Structure Observation)

Figure 14:
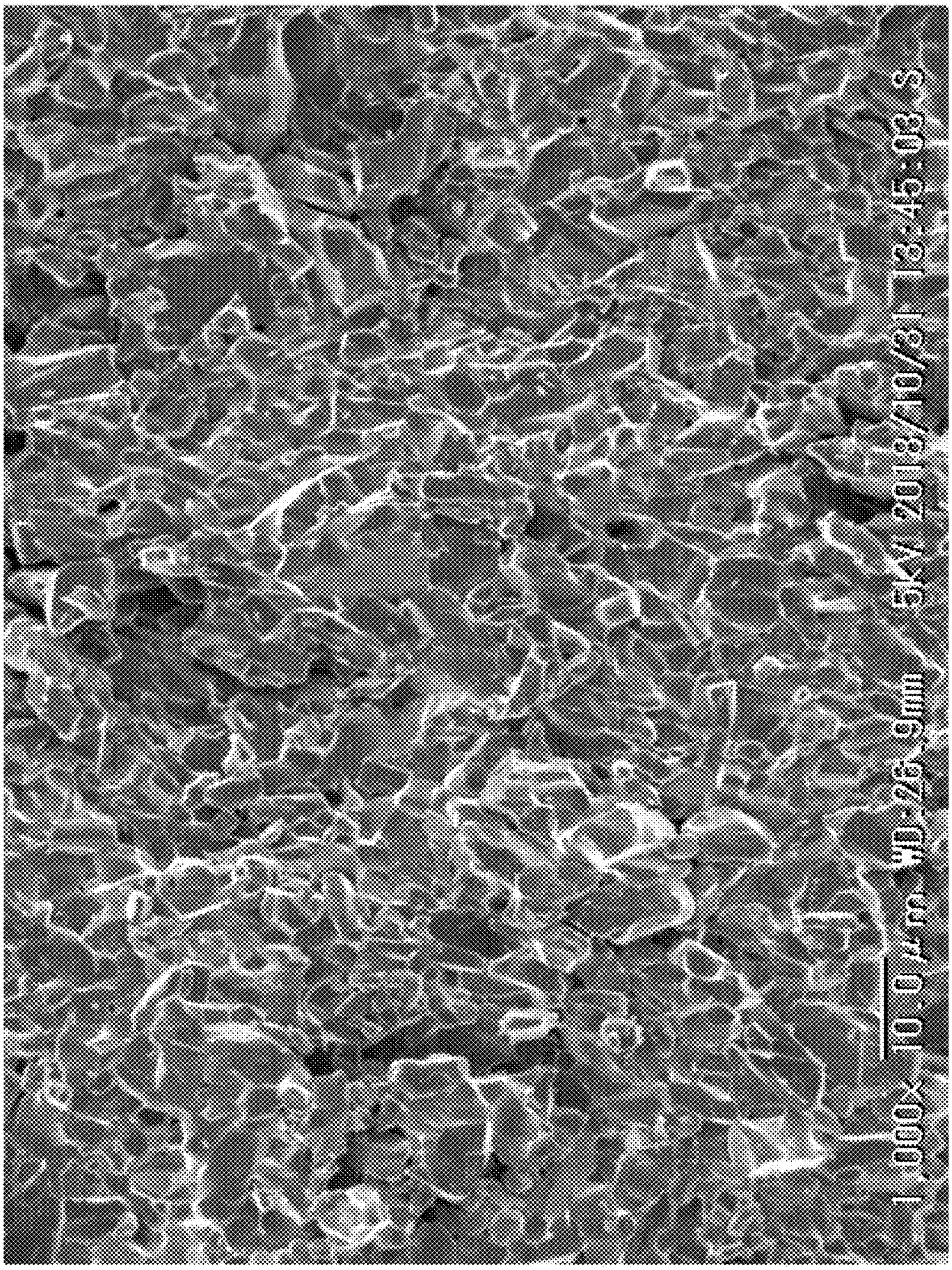
FIG. 14 is a scanning electron micrograph showing the structure of a sintered member obtained in Example 11.
Figure 15:
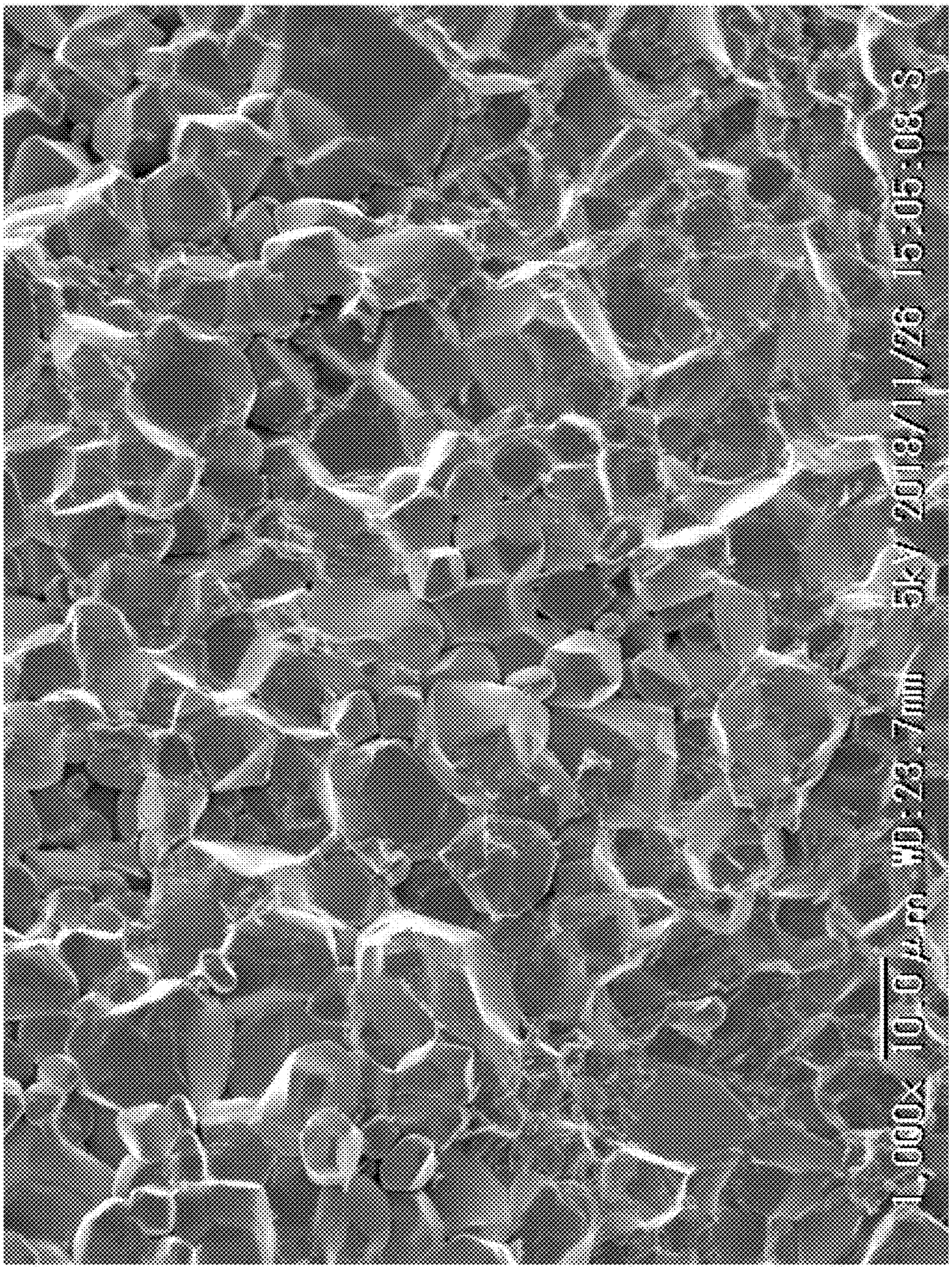
FIG. 15 is a scanning electron micrograph showing the structure of a sintered member obtained in Example 12.

The sintered members of Examples 11 and 12 obtained as described above were broken by applying a bending load using a procedure with a combination of pliers and the like, and the broken-out sections were observed with a scanning electron microscope SEM (VE-8800 manufactured by KEYENCE CORPORATION). FIGS. 14 and 15 are observations (1000 magnifications) of Examples 11 and 12, respectively. Although there is a difference in the growth rate due to the effect of an added element, the particles are clearly bonded to each other as compared with Comparative Example 1, indicating that the disclosed technique is also effective after adding the elements.

(Latent Heat Calorie and Density)

In order to evaluate the heat storage characteristics of Examples 11 and 12, differential scanning calorimetry DSC (DSC6000 manufactured by Seiko Instruments Inc.) was performed. In addition, a density was calculated from a volume calculated by measuring a cylindrical sintered member produced as Example 11 or 12 and the total weight of a sintered member weighed by an electronic balance, and a relative density value was estimated by comparison with the density of a vanadium dioxide compound (4.33 g/cc). The measured values obtained are shown in Table 1.

TABLE 1

| | Latent heat (J/cc) | Relative density (%) |
|---|---|---|
| Example 11 | 131 | 97 |
| Example 12 | 110 | 98 |

As can be seen from Table 1, the latent heat values are smaller than that of the case without an additive element, but there is no big difference between the amount of latent heat (140 J/cc) measured for the powder of Smartec-HS120 manufactured by Kojundo Chemical Laboratory Co., Ltd. and the amount of latent heat of Example 11, and between the amount of latent heat (110 J/cc) measured for the powder of Smartec-HS10 manufactured by Kojundo Chemical Laboratory Co., Ltd. and the amount of latent heat of Example 12. Therefore, even when an additive element is added, the amount of latent heat is not affected by the present invention. On the other hand, it was found that the relative density reached 95% or more in both Examples.

—X-Ray Diffraction Measurement—

Figure 16:
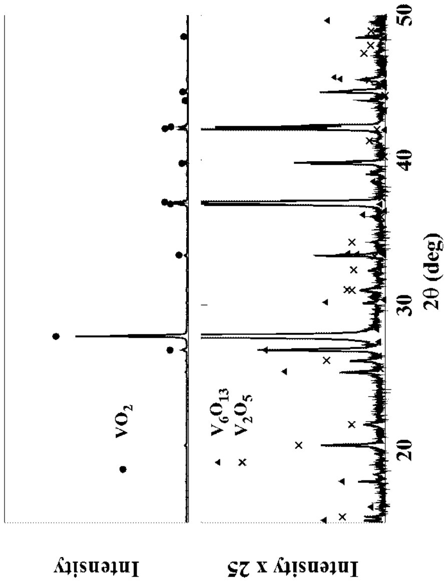
FIG. 16 is a graph showing an X-ray diffraction profile measured for Example 1.
Figure 17:
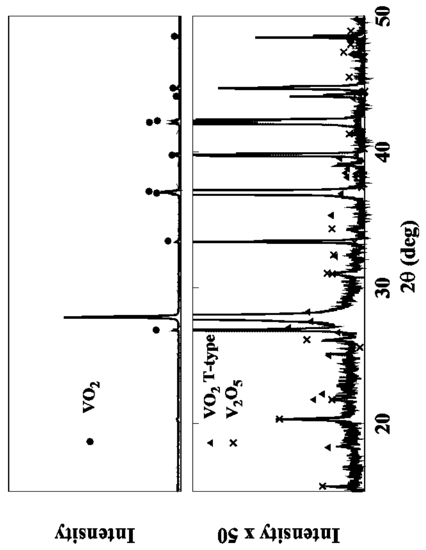
FIG. 17 is a graph showing an X-ray diffraction profile measured for Example 5.
Figure 18:
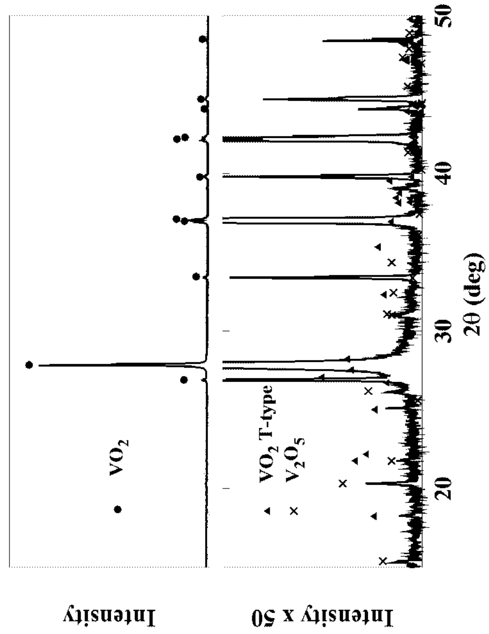
FIG. 18 is a graph showing an X-ray diffraction profile measured for Example 6.

In order to identify constituent oxides and examine the proportions of the constituent oxides after forming a member, for Examples 1, 5, and 6, a part of each member obtained was pulverized, and X-ray diffraction measurement was performed. FIGS. 16, 17, and 18 are X-ray diffraction profiles for the pulverized samples obtained from Examples 1, 5, and 6, respectively. The upper half of each figure shows an entire profile, and the lower half is a magnified profile such that a profile with weak diffraction intensity can be seen. Regarding Example 1, three types of $VO_2$, $V_6O_{13}$, and $V_2O_5$ were confirmed from the X-ray diffraction profile, and the ratio of masses of the above oxides, w[$VO_2$], w[$V_6O_{13}$], and w[$V_2O_5$], which was calculated from the peak intensity ratio and the density of each oxide, was 96.0:1.5:2.5. In the powder synthesis process before sintering, w[$VO_2$]:w[$V_6O_{13}$]:w[$V_2O_5$] was 95.0:0.0:5.0. In addition, the change in the weight before and after sintering is 1% or less, and therefore, the change in the value for $V_2O_5$ between the powder stage and the formed member stage is not due to evaporation and the like. Further, $V_6O_{13}$, which contains less constituting oxygen element than $V_2O_5$, has appeared, and it is therefore found that, although oxygen is released from $V_2O_5$ through a reaction pathway similar to Formula 1, a part of the balanced equilibrium phase is $V_6O_{13}$. At this time, the reaction of Formula 1 progresses in a part of the member being sintered, and after the member is formed, the proportion of the weight of the $VO_2$ is higher than that at the powder synthesis. The value of d calculated for the member after sintering from the obtained ratio was 0.011.

On the other hand, from the X-ray diffraction profile measured by pulverizing a part of Example 5, regarding $VO_2$, in addition to a monoclinic type, which is known to have a stable structure at room temperature, the existence of an oxide was confirmed that has an element composition represented by the same molecular formula $VO_2$ as the Monoclinic type but has a crystal structure known as the T phase of a triclinic type. The member was constituted of three types of phases including $V_2O_5$. The ratio of the respective weights, w[$VO_2$], w[$VO_2$ (T phase)], and w[$V_2O_5$], which was determined from the peak intensities of the profile and the density, was 97.5:1.2:1.3. As in the case of Example 1, the change in the weight ratio from the powder synthesis step is related to Formula 1, and it is indicated that oxygen was released from a part of $V_2O_5$, which then changed to stable $VO_2$ or metastable $VO_2$ (T phase). For the member after sintering, the value of d obtained from the above weight ratio is 0.0076.

Further, from the X-ray diffraction profile measured by pulverizing a part of Example 6, the constituent phases are $VO_2$, $VO_2$ (T phase), and $V_2O_5$, as in the case of the measurement for Example 5, and the ratio of w[$VO_2$], w[$VO_2$ (T phase)], and w[$V_2O_5$] was 99.0:0.3:0.7. For the member after sintering, the value of d obtained from the above weight ratio is 0.0025.

Figure 19:
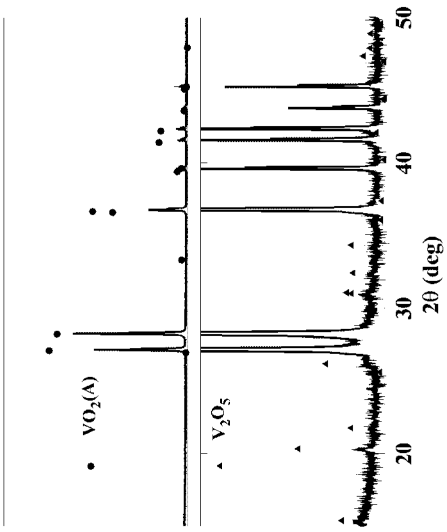
FIG. 19 is a graph showing an X-ray diffraction profile measured for Example 11.
Figure 20:
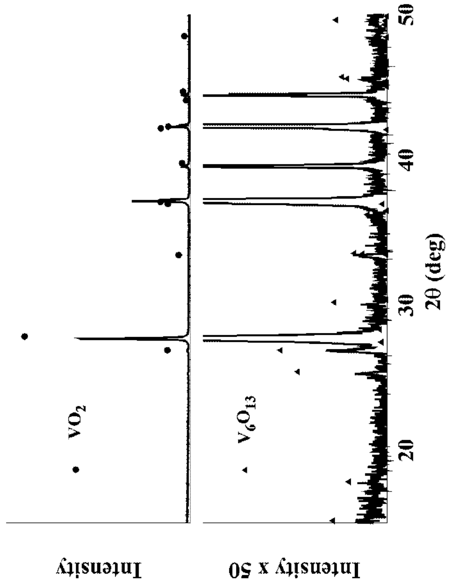
FIG. 20 is a graph showing an X-ray diffraction profile measured for Example 12.

In order to identify the constituent oxides in the members in the case of element substitution, for Examples 11 and 12, a part of each member obtained was pulverized, and X-ray diffraction measurement was performed. FIGS. 19 and 20 are X-ray diffraction profiles for the pulverized samples obtained from Example 11 and 12, respectively. The upper half of each figure shows an entire profile, and the lower half is a magnified profile such that a profile with weak diffraction intensity can be seen. Regarding Example 11, from the X-ray diffraction profile, two types of oxides were confirmed of $V_2O_5$ and a monoclinic type of oxide called A phase, which is characteristic of Cr-added $VO_2$, and the ratio of masses of the above oxides, $w[V_2]$ and $w[V_2O_5]$, which was calculated from the peak intensity ratio and the density of each oxide, was 97.0:3.0. The value of d obtained from this ratio is 0.011. On the other hand, regarding Example 12, $VO_2$ and $V_6O_{13}$ were confirmed from the X-ray profile, and the ratio of $w[VO_2]$ and $w[V_6O_{13}]$ was 95.0:5.0. For the member after sintering, the value of d obtained from the above weight ratio is 0.008.

The present invention is not limited to the description of the above-described embodiments and Examples of the invention. Various modifications are also included in the present invention to the extent that those skilled in the art can easily conceive without departing from the scope of claims.

INDUSTRIAL APPLICABILITY

The material and member including the same of the present invention are disposed inside an air conditioner mounted on an industrial device, an automobile, or the like as a regenerative heat storage exchanger and can be utilized for air temperature control. In addition, it is considered that the material and member including the same of the present invention are disposed in a part of a building material of a house or the like and are utilized for heat retention adjustment for suppressing indoor temperature fluctuations within a range smaller than outside air temperature changes in summer and winter.

The invention claimed is:

1. A solid latent heat storage member comprising a bulk body obtained by pressurized sintering a powder material in a vacuum atmosphere so that powder particles of the powder material are directly bonded each other to form the bulk body, the powder material comprising vanadium and oxygen as main components, wherein the powder material comprises a $VO_2$-based vanadium oxide and one or more types of vanadium oxides other than the $VO_2$-based vanadium oxide, the $VO_2$-based vanadium oxide containing an oxide obtained by partial substitution of V of an oxide represented by a chemical formula $VO_2$ with one or more substitution elements of W, Cr and Al, and having a proportion of the partial substitution of more than 0 atomic % and 20 atomic % or less, wherein, when ratio of sum of atomic % of the vanadium and the substitution elements to atomic % of the oxygen in all powder is expressed as 1:(2+d), d is $0<d<0.1$, a surface of the powder has been oxidized by heating in an air atmosphere so that the surface of the powder comprises a $V_2O_5$-based vanadium oxide, a latent heat quantity per volume of the solid latent heat storage member is 100 J/cc or more, the bulk body has a foam-like pattern structure, which is observed by a scanning electron microscope, inside, a relative density of the bulk body based on the density of $VO_2$ is 90% or more, and a compression strength of the bulk body is 46 MPa or higher.

2. The solid latent heat storage member according to claim 1 comprising a plurality of types of vanadium oxides including a partially substituted $VO_2$ oxide obtained by substituting a part of V of an oxide represented by a chemical formula $VO_2$ with one or more elements of W, Cr and Al, wherein proportion of weight of the partially substituted $VO_2$ oxide in all the vanadium oxides, which is determined by phase identification using X-ray diffraction, is 95% or more and less than 100%.

3. The solid latent heat storage member according to claim 1, wherein the powder material is sintered at temperature of 670° C. to 1050° C.

4. The solid latent heat storage member according to claim 1, wherein the latent heat quantity per volume of the solid latent heat storage member is 200 J/cc or more.

5. The solid latent heat storage member according to claim 1, wherein the compression strength of the bulk body is 60 MPa or higher.

* * * * *